United States Patent
Nettleton et al.

(10) Patent No.: US 7,751,462 B2
(45) Date of Patent: Jul. 6, 2010

(54) MONO-SLAB LASER CAVITY

(75) Inventors: John E. Nettleton, Fairfax Station, VA (US); Bradley W. Schilling, Fredericksburg, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 651 days.

(21) Appl. No.: 11/686,329

(22) Filed: Mar. 14, 2007

(65) Prior Publication Data

US 2009/0059993 A1 Mar. 5, 2009

(51) Int. Cl.
*H01S 3/08* (2006.01)

(52) U.S. Cl. ..................... 372/107; 372/108
(58) Field of Classification Search .......... 372/95, 372/107, 19, 99, 70; 359/858
See application file for complete search history.

(56) References Cited

U.S. PATENT DOCUMENTS

| | | | | |
|---|---|---|---|---|
| 3,307,113 A | * | 2/1967 | Hughes | 359/347 |
| 4,605,290 A | * | 8/1986 | Burns | 359/858 |
| 5,917,843 A | * | 6/1999 | Greene | 372/19 |
| 6,147,793 A | * | 11/2000 | Alford et al. | 359/330 |
| 6,373,865 B1 | * | 4/2002 | Nettleton et al. | 372/10 |
| 6,556,614 B2 | * | 4/2003 | Nettleton et al. | 372/107 |
| 6,738,396 B2 | * | 5/2004 | Filgas et al. | 372/19 |
| 6,898,218 B2 | * | 5/2005 | McCarthy | 372/21 |
| 7,184,616 B2 | * | 2/2007 | Mead et al. | 385/10 |
| 7,239,653 B2 | * | 7/2007 | Setzler | 372/20 |
| 2002/0122455 A1 | * | 9/2002 | Knights et al. | 372/108 |

* cited by examiner

*Primary Examiner*—Minsun Harvey
*Assistant Examiner*—Tuan N. Nguyen
(74) *Attorney, Agent, or Firm*—Richard Kim

(57) ABSTRACT

A YAG/Nd:YAG block where an Nd:YAG block ends in a peak integrated inside a YAG block. The YAG block has reflective surfaces positioned at 45° to one another. The angled reflective surfaces serve as a "mirror" within the laser cavity to effectively increase the length of the cavity by a factor greater than 2. Fused to the output end of the laser cavity are a polarizer, an active/passive Q-switch, a one quarter waveplate and an output coupler. In operation, the laser cavity is pumped either from the side or the end of the cavity. The optical components of the present invention are bonded to form one optical 'block'. All the components are pre-aligned during the crystal manufacturing process to form the optical laser cavity. The width of the cavity should be selected such that nearly all of the laser diode pump output is absorbed by the cavity.

5 Claims, 1 Drawing Sheet

MONO-SLAB LASER CAVITY

GOVERNMENT INTEREST

The invention described herein may be manufactured, used, sold, imported, and/or licensed by or for the Government of the United States of America.

FIELD OF THE INVENTION

The present invention generally relates to laser cavities and more particularly to a mono-slab laser cavity.

BACKGROUND OF THE INVENTION

The present invention is an improvement to the monoblock laser described and claimed in U.S. Pat. No. 6,556,614, entitled, Monolithic Solid State LASER Assembly and Method of Manufacture, issued Apr. 29, 2003. This patent is incorporated herein by reference with only the necessary parts being duplicated in this specification.

The invention described in U.S. Pat. No. 6,556,614, is a photon pumped laser cavity assembly consisting of a pair of coaxial rods made from laser gain material with precisely cut side-faces and end-faces. Some of the end-faces are covered by at least one of a dielectric or metal coating highly reflective to the laser output beam, a wafer of polarizing material, and a dielectric or metal coating partially reflective to the laser beam. More details of this prior art will be described in the Detailed Description of the Invention.

Laser range finders are becoming an increasingly vital component in high precision targeting engagements. The precise and accurate range to target information is an essential variable to the fire control equation of most weapon systems. Unfortunately, current fielded laser range finders are bulky, heavy and expensive. These laser range finders were not developed with the idea that they would be carried by forces.

The monoblock laser described in the U.S. Pat. No. 6,556,614 makes the development/fabrication of a low cost, compact laser range finder feasible. Unfortunately, the size of the monoblock laser still could be smaller.

SUMMARY OF THE INVENTION

There is a need to make monoblock lasers smaller. Accordingly, one object of the present invention is to make the development/fabrication of a very compact laser range finder/designator feasible. The invention includes a YAG/Nd:YAG block, in which an Nd:YAG block ending in a peak is integrated inside a YAG block. The YAG block is configured such that it has reflective surfaces positioned at 45° to one another. The angled reflective surfaces serve as a "mirror" within the laser cavity to increase the length of the cavity by a factor greater than 2. At the output end of the laser cavity, a polarizer, an active/passive Q-switch, a one quarter waveplate and an output coupler are fused to the end. In operation, the laser cavity is pumped either from the side or the end of the cavity. The optical components of the present invention are bonded (diffusion or optical epoxy) to form one optical 'block'. All the components are prealigned during the crystal manufacturing process to form the optical laser cavity. The width of the cavity should be selected such that nearly all of the laser diode pump output is absorbed by the cavity.

To the accomplishment of the foregoing and related ends, the invention provides the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the detailed description that follows, identical components have been given the same reference numerals.

DETAILED DESCRIPTION

Figure 1:
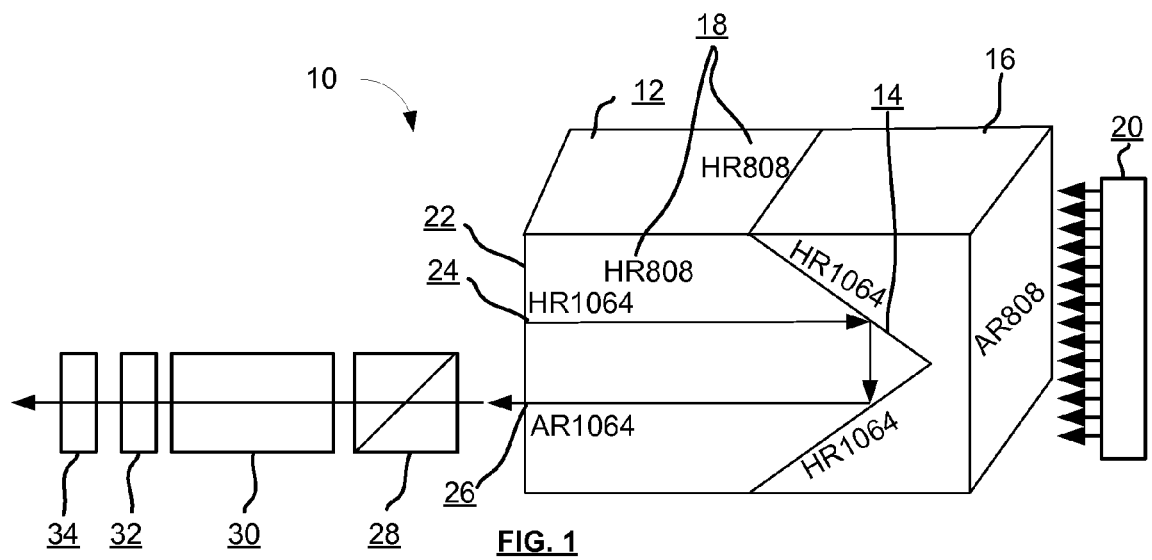
FIG. 1 is a schematic representation of the invention in accordance with an embodiment of the invention.

Referring now to the drawings, and initially to FIG. 1, FIG. 1 illustrates a mono-slab laser cavity 10 with a laser diode pump 20. In a preferred embodiment of the invention, the invention includes a YAG/Nd:YAG block, in which an Nd:YAG having a peaked end is integrated inside a YAG block. The YAG block is configured such that it has reflective surfaces positioned at 45° to one another. The angled reflective surfaces serve as a "mirror" within the laser cavity to increase the length of the cavity by a factor greater than 2. At the output end of the laser cavity are typical laser elements including, a polarizer, an active/passive Q-switch, a one quarter waveplate and an output coupler.

In operation, the laser cavity is pumped either from the side or the end of the cavity. The optical components of the present invention are bonded (diffusion or optical epoxy) to form one optical 'block'. All the components are prealigned during the crystal manufacturing process to form the optical laser cavity. The width of the cavity should be selected such that nearly all of the laser diode pump output is absorbed by the cavity. The one quarter waveplate is only required if an active Q-switch is selected for use.

As shown in FIG. 1, the laser cavity itself is block 12 of Nd:YAG with a peaked end 14. The peaked end 14 of the Nd:YAG block is integrated in the YAG block 16 which is configured such that it is a female counterpart to the peaked end 14 of the Nd:YAG block 12. The angles of the peaked end 14 and the female counterpart of the YAG block 16 are preferably 45°. The outer four sides 18 (two shown) of Nd:YAG block 12 have surfaces that are a Highly Reflective (HR) surface (e.g., 808 nm) and the reflective surfaces of the peaked end 14 are at, e.g., HR 1064 nm. The end where the laser diode pump 20 is preferably positioned is an Antireflective (AR) surface (e.g., 808 nm). The opposite end 22 of the Nd:YAG is split so that one portion 24 is reflective at HR 1064 nm and the output 26 is configured to have a surface of AR 1064 nm. Attached to the output is a polarizer 28, then an active/passive Q-switch 30, a one quarter waveplate 32, and an output coupler 34. The one quarter waveplate is only required if an active Q-switch is selected for use. The physical dimensions of the cavity can essentially be halved from conventional monoblock lasers in that the effective cavity length is virtually doubled by this configuration.

From this description and FIG. 1, those skilled in the art could engineer any number of (anti)(highly)reflective surfaces and laser cavity configurations with a peaked end to reduce the size of the laser cavity. For example, FIG. 2 shows such an alternate configuration.

Figure 2:
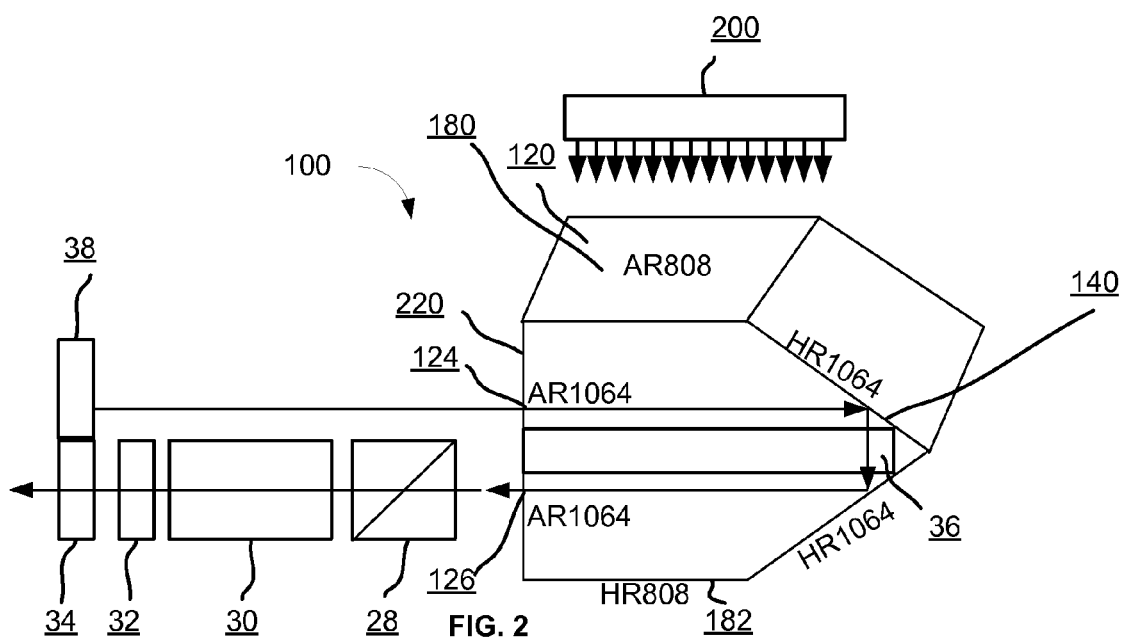
FIG. 2 is schematic representation of in accordance with another embodiment of the invention.

Referring now to FIG. 2, FIG. 2 illustrates another embodiment of a mono-slab laser cavity 100 and a laser diode pump 200. Instead of having the peaked end 14 of the Nd:YAG block 12 integrated in a YAG block 16, in one embodiment a YAG block 36 can be integrated inside a Nd:YAG block 120, but is not required. The integrated YAG block 36 acts as a spacer and increases efficiency of entire laser cavity, i.e., the YAG block 36 doesn't absorb the pump at the edge of the optics. So long as the peaked end 140 has a highly reflectively coating (e.g., HR 1064 nm), the laser cavity will still laze with a diode pump 200 being pumped from the side on the Nd:YAG block 120. On the side 180 of the pumping diode there is an antireflective coating (e.g., AR 808 nm) and on the opposite side 182 of the block a highly reflective coating (e.g., HR 808 nm). Instead of having a split output end as shown in FIG. 1, the output end 220 of the alternate configuration has an antireflective coating with a highly reflective mirror 38 positioned on one side of the block 120. On the other side of the output end are the polarizer 28, the active/passive Q switch 30, the one quarter waveplate 32, and the output coupler 34.

All the optical components previously described may be fabricated in YAG based materials. This lends to robust/dependable operation over a wide range of thermal conditions a laser must operate. Other materials may be used in the invention if conditions allow. For example, Nd:YVO4, Nd:YLF, Nd:YAP and others are all candidate materials that may benefit from the invention's configuration.

The invention simplifies the producibility of a laser range finder/designator system. The fabrication of the invention can be done using batch processing. Large rectangular, precoated optical components can be joined together, optically aligned to form the laser cavity and then sliced to produce modules. This batch process can greatly reduce the overall fabrication costs of the module.

The invention is a module that requires none of the labor extensive alignment procedures of current laser range finders/designators. No optical holders have to be fabricated, no complex engineering is required to design the optical cavity, and no precise laser cavity alignments are required. Production labor and material cost are, therefore, greatly reduced.

The invention is a modular component and thus it lends itself to ease of design for different pump sources. It can be incorporated in a flash lamp pumped or laser diode pumped system. In particular, it can be quite easily coupled with a laser diode stack array for end pumping which gives an extremely wide operating temperature range. The energy of the pump source (e.g. drive electronics) can be tailored for the specific mission (e.g. long range vs. medium range performance) without forcing all of the systems to the high demand requirements of the few. In particular, the cavity is configured for optimal absorption for diode laser pumping over broad temperature ranges.

The present invention may be used as the laser source in very compact laser range finders or laser designators. It can be coupled with an optical parametric oscillator (OPO) cavity for generation of an eye safe laser output for eye safe laser range finding. These laser rangefinders have both military and commercial applications. The compact design of the invention also lends itself to placement in other laser-based portable/handheld devices. These may be medical devices, industrial tools or scientific equipment that would benefit from the size/weight reduction, dependable performance, and low cost of the laser cavity.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A laser resonator block comprising:

a first portion of the laser resonator block being made of a first laser resonator material, the first portion of the laser resonator block having a peaked end such that at least two sides of the peaked end are angled and coated in a highly reflective material;

a second portion of the laser resonator block being made of a second laser resonator material and coated in an antireflective material, the second portion being configured with the first portion such that when a light source is pumped through the laser resonator block it produces a laser pulse by reflecting the light from one end of the laser resonator block to one of the two sides of the peaked end and then reflecting to the second of the two sides of the peaked end and then out to an output; wherein the second portion is integrated inside the first portion and the light source is pumped through one side of the first portion;

a rod with a handle fastened to an end for probing the ground to locate the buried object;

a polarizer;

an active/passive Q-switch;

a one quarter waveplate (only required if an active Q-switch is selected for use); and an output coupler;

wherein the polarizer, active/passive Q-switch, one quarter waveplate, and output coupler are optically bonded to the laser resonator block in series.

2. The laser resonator block of claim 1 wherein the second portion is a female counterpart to the peaked end of the first portion and the light source is pumped through one end of the second portion.

3. The laser resonator block of claim 1 further comprising:

an optical parametric oscillator optically coupled to the output end of the laser resonator block.

4. A laser resonator block comprising:

a first portion of the laser resonator block being made of a first laser resonator material, the first portion of the laser resonator block having a peaked end such that at least two sides of the peaked end are angled and coated in a highly reflective material;

a second portion of the laser resonator block being made of a second laser resonator material and coated in an antireflective material, the second portion being integrated inside the first portion and a light source is pumped through one side of the first portion to one of the two sides of the peaked end and then reflecting to the second of the two sides of the peaked end and then out to an output; and further comprising:

a rod with a handle fastened to an end for probing the ground to locate the buried object;

a polarizer;

an active/passive Q-switch;

a one quarter waveplate; and
an output coupler;
wherein the polarizer, active/passive Q-switch, one quarter waveplate, and output coupler are optically bonded to the laser resonator block in series.

5. A laser resonator block of claim 4, wherein the two coated sides of the peaked end in the first portion of the laser resonator block are angled at about 45 degrees.

* * * * *